US009716600B1

(12) United States Patent
Maluf

(10) Patent No.: US 9,716,600 B1
(45) Date of Patent: Jul. 25, 2017

(54) AUGMENTED ROUTER PROCESSING

(75) Inventor: David A. Maluf, Mountain View, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 1112 days.

(21) Appl. No.: 12/288,245

(22) Filed: Oct. 17, 2008

(51) Int. Cl.
G06F 15/173 (2006.01)
H04L 12/58 (2006.01)
G06Q 10/10 (2012.01)
H04L 12/26 (2006.01)

(52) U.S. Cl.
CPC ............ H04L 12/585 (2013.01); H04L 51/12 (2013.01); H04L 51/14 (2013.01); G06Q 10/107 (2013.01); H04L 12/2602 (2013.01)

(58) Field of Classification Search
CPC ... H04L 51/12; H04L 12/585; H04L 12/2602; H04L 51/14; G06Q 10/107
USPC .................................................. 709/206, 225
See application file for complete search history.

(56) References Cited

U.S. PATENT DOCUMENTS

| | | | |
|---|---|---|---|
| 7,937,353 B2* | 5/2011 | Bernoth et al. .................. 706/46 |
| 2002/0120694 A1* | 8/2002 | Bantz .................... H04L 41/044 709/206 |
| 2006/0168038 A1* | 7/2006 | Lin .............................. 709/206 |
| 2007/0038705 A1* | 2/2007 | Chickering et al. ........... 709/206 |
| 2008/0228892 A1* | 9/2008 | Staack ................ H04L 65/1006 709/206 |
| 2010/0263045 A1* | 10/2010 | Dulitz et al. .................... 726/22 |

* cited by examiner

Primary Examiner — Oleg Survillo
(74) Attorney, Agent, or Firm — Patent Capital Group

(57) ABSTRACT

An augmented router that reads and analyzes asserted source and asserted destination of a message, selected message metadata, message data type and other relevant message attributes to determine (i) whether the message is proper to deliver to the asserted destination, (ii) whether the asserted source is, or should be, quarantined and (iii) whether message format should be converted between Web mail and Small Mail Transport Protocol (SMTP). The augmented router optionally accumulates statistics on messages that are forwarded, and on messages that the router declines to forward.

6 Claims, 8 Drawing Sheets

AUGMENTED ROUTER PROCESSING

FIELD OF THE INVENTION

This invention relates to augmented signal processing by a network router.

BACKGROUND OF THE INVENTION

A conventional network router, part of ISO Layer 3, has several primary functions: (1) to receive read the asserted destination of an incoming message; (2) to listen to the network communications between other routers, to learn which output terminal, if any, is most appropriate for forwarding the received message, optionally using a routing table that can be constructed by this router (control phase); (3) to forward the message, if the asserted destination can be reached from this router (forwarding phase); and (4) to discard the message if the asserted destination cannot be reached from this router. Ideally, the router will issue the message from an output terminal if the asserted destination can be reached from this router without passing through this router again, in order to minimize redundant network traffic. Apart from these requirements, a router operates almost transparently, issuing a received message from an output terminal without collecting any metadata on the received message or authentication of the message source. One goal in using a router is to reduce network traffic by stopping the propagation of a message that cannot be efficiently delivered to the asserted destination from this router. Network traffic could be further reduced if one or more aspects of the message could be characterized, and a message whose type or content is improper for that asserted destination can be terminated. A routing table may provide (1) information on which connections lead to particular groups of Internet addresses, (2) priorities for connections to be used, and (3) rules or standards for handling routine messages and priority or special case messages. Router statistics and message metadata are discarded after message transmission.

Network e-mail communications are often handled by one of two or more e-mail transmission protocols that are inconsistent with each other, Small Mail Transfer Protocol (SMTP) and "Web Mail". STMP was first proposed and developed in 1982 by Jonathan Postel and other workers, in RFC821, RFC 1123, and subsequent RFC documents, as a protocol for sending e-mail messages. Web Mail, proposed in 1995 by Luca Manunza and first released in 1997, is an e-mail service intended to be addressed by a Web browser. Web Mail can be received by any Internet-connected browser; but absent such connection an old Web Mail message cannot normally be received. Web Mail has no standard interface, and the number of different Web Mail protocols approximates the number of major networks in the world.

Protocols for receiving e-mail messages include the Post Office Protocol (POP) and the Internet Message Access Protocol (iMAP), which facilitate accessing of specified e-mail accounts on a mail server. A large percentage of e-mail is transmitted using SMTP, which coexists uneasily with Web Mail.

What is needed is an augmented router system that: (1) archives and indexes router message statistics, including message metadata and uses this information to intelligently determine which messages are properly forwarded to an asserted destination, assuming that the asserted destination does exist and can be reached from this router; and (2) translates between SMTP and Web Mail for e-mail messages to be transmitted from a router that serves as an interface between an SMTP network and a Web Mail network.

SUMMARY OF THE INVENTION

These needs are met by the invention, which provides a modification of normal router functions (receive a signal at an input terminal, read a destination associated with the signal, issue the signal from a selected output terminal if the destination can be reached from this output terminal without returning to this router). In one embodiment of the invention, useful for network signal profiling, the router: (1) receives a message at an input terminal; (2) reads the asserted message destination(s) and a selected part of the message metadata; (3) characterizes the message data by type (e.g., access request, document, alarm signal, part of a static image, part of a video presentation, etc.), by time received, by length (measured in bytes or in μsec), and by content (optional), using selective word/phrase searching; (4) performs a fast index search to determine (i) whether an asserted destination can be reached from one or more terminals on this router and (ii) whether the asserted destination(s) is/are proper for this type of message; (5) optionally stores the message (header, data, trailer) and asserted destination, depending upon data type; (6) optionally logs and indexes the message data, data length and/or data type and/or time received; and (7) causes the message to be issued from a selected output terminal if an asserted destination can be reached from this output terminal without returning to this router and only if the message data is of a type that can be properly received at the asserted destination.

Optionally, the router re-designates at least one destination, including itself (no further transmission from this router), if the router determines that an asserted destination (i) cannot be reached or (ii) is improper; this procedure may be used if the router determines that the received message belongs to a "disfavored" category or the asserted source is "quarantined" and that this message should not be further transmitted. This augmented router allows the user to monitor, or to track after the fact, the receipt time and nature of selected classes of messages that are received by the router and the (authenticated) destination or other disposition of each such received message. Steps (3), (4), (5), (6) and/or (7) can be performed by a proxy server associated with the router. The message analytics and archiving are performed separately for each asserted source, each asserted destination and each network region In another embodiment, useful for network mail reformatting and delivery, the router: (1) receives a Web mail message at an input terminal; (2) (i) translates an Web Mail message to simple mail transfer protocol (STMP) for transmission (optional) or (ii) translates an SMTP message to Web Mail for transmission (optional); (3) reads the asserted message destination(s) and a selected part of the message metadata; (4) performs a fast index search to determine whether the asserted destination(s) is/are proper for this type of message; (5) optionally stores the message (header, data, trailer) and asserted destination, depending upon data type; (6) optionally logs and indexes the message data, data length and/or data type and/or time received; and (8) issues the message from a selected output terminal if an asserted destination can be reached from this output terminal without returning to this router and only if the message data is of a type that can be properly received at the asserted destination. Optionally, where the message is already expressed in an STMP format, the router provides at least one of POP and iMAP (e-mail receipt protocols) to properly receive the STMP message at the input terminal. Steps (2), (3), (4), (5), (6), and/or (7) can be performed by a proxy server associated with the router.

In another embodiment, useful for browser monitoring, the router: (1) receives a message at an input terminal; (2) reads the asserted message destination(s) identifier(s), the asserted source identifier, and a selected part of the message metadata; (3) authenticates the asserted source and/or the asserted destination(s); (4) performs a fast index search to determine whether an asserted destination(s) can be reached from one or more output terminals on this router; (5) characterizes the message data by type (e.g., document, access request, alarm signal, part of a static image, part of a video presentation, etc.), by time received, by length (measured in bytes or in µsec), and by content (optional), using selective word/phrase searching; (6) prepares, or adds to, indices that set forth concerning (i) the source, (ii) the asserted destination, (iii) data type, (iv) time received (7) issues the message from a selected output terminal if an asserted destination can be reached from this output terminal without returning to this router and only if the message data is of a type that can be properly received at the asserted destination. Steps (2), (3), (4), (5), (6) and/or (7) can be performed by a proxy server associated with the router.

An Edge Proxy Server, which may be co-located with, or spaced apart from, the augmented router preferably provides some of the services needed by the router. The router may communicate with the Proxy Server and/or the Proxy Server may directly receive selected information that is also received by the router. Optionally, a Proxy Server may serve one, or two or more, augmented routers, and each augmented router may identical or different "edge computing" services.

DESCRIPTION OF BEST MODES OF THE INVENTION

Figure 1:
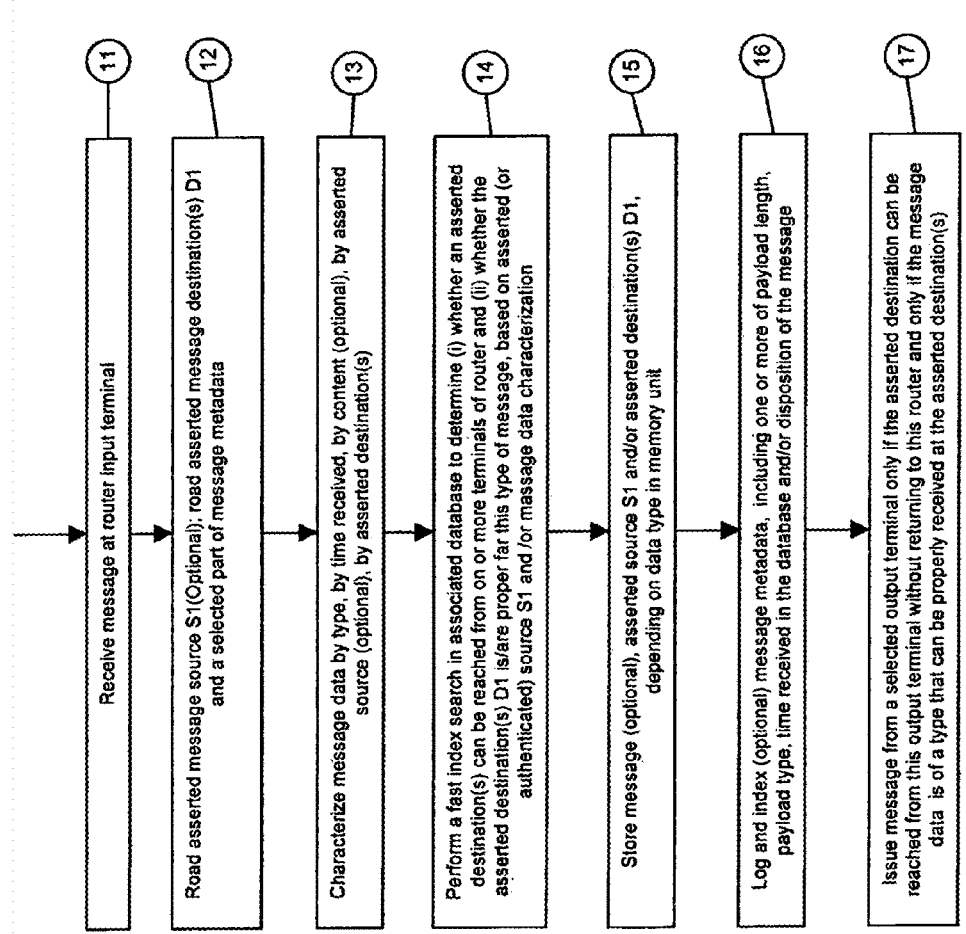
FIGS. 1, 3 and 5 are flow charts for implementing embodiments of the invention.
Figure 2:
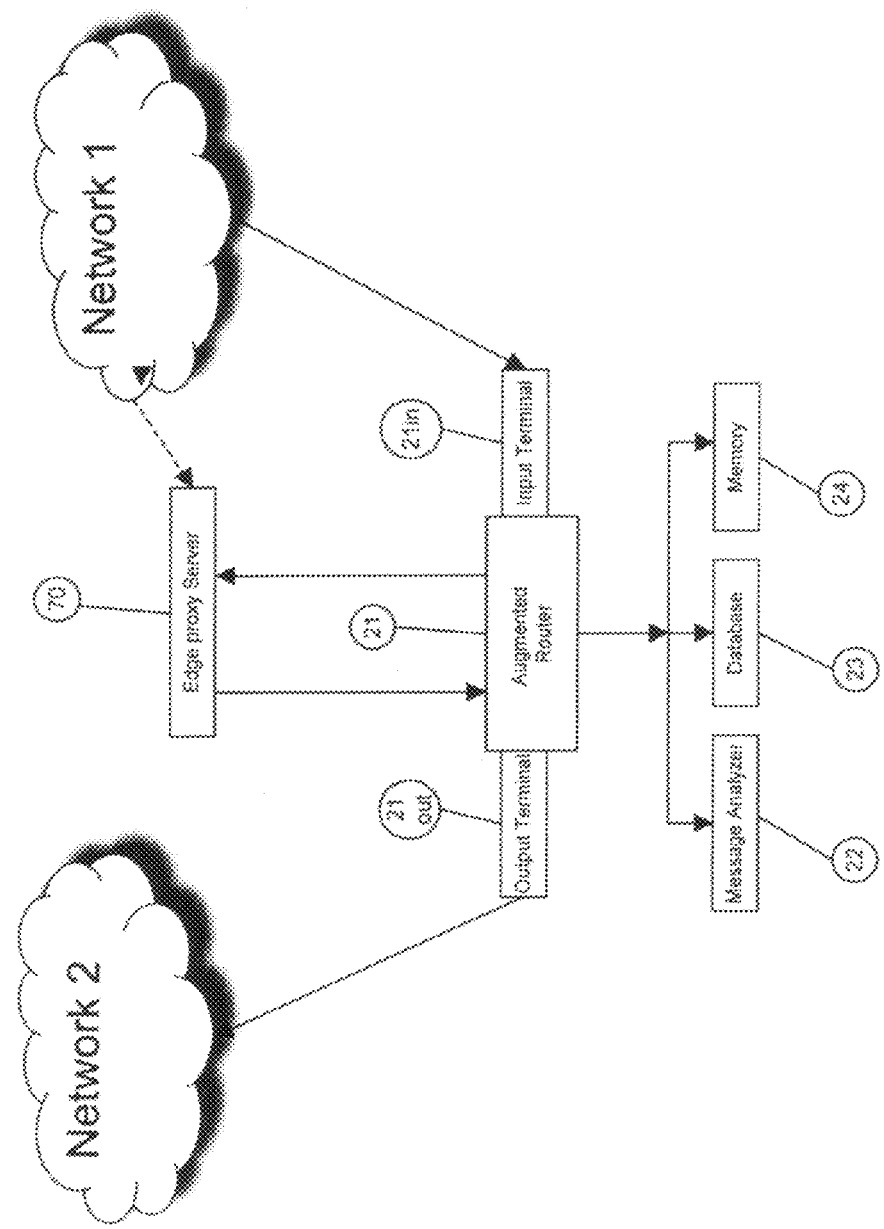
FIGS. 2, 4 and 6 schematically illustrate operation of an augmented router, according to first, second and third embodiments of the invention, in a communication network.

In one embodiment, useful for network signal profiling and illustrated in a flow chart in FIG. 1, an augmented router 21: (1) receives a message at the router input terminal 21 in (step 11); (2) reads the asserted message source S1 (optional), the asserted message destination(s) D1 and a selected part of the message metadata, using a message analyzer 22 associated with the router 21 (step 12); (3) characterizes the message data by type (e.g., document, access request, alarm signal, part of a static image, part of a video presentation, etc.), by time received, by length (measured in bytes or in µsec), and by content (optional), using selective word/phrase searching, (step 13); (4) performs a fast index search in an associated database 23 to determine (i) whether an asserted destination D1 can be reached from one or more terminals 21 out on this router 21 and (ii) whether the asserted destination(s) D1 can properly receive this type of message, based on asserted (or authenticated) source S1, asserted (or authenticated) destination(s) and/or on message data characterization (step 14); (5) optionally stores the message (header, data, trailer), asserted source S1 identifier and asserted destination(s) D1 identifier, depending upon data type, in a memory unit 24 associated with the router 21 (step 15); (6) optionally logs and indexes the message metadata, including one or more of payload length (measured in bytes or in µsec), data type, time received by router 21 and disposition of the message (step 16); and (7) issues the message from a selected output terminal 21 out if the asserted destination(s) D1 can be reached from this output terminal without returning to this router 21, and only if the message data is of a type that can be properly received at the asserted destination(s) D1 (step 17). Optionally, the router re-designates at least one alternative destination D1 (alt), including itself (no further transmission of this message from this router), if the router 21 determines that the asserted destination D1 is improper; this procedure may be used if the router 21 determines that the received message belongs to a designated "disfavored" category or has been received from a "quarantined" source S1, and that this message should not be further transmitted. The augmented router 21 allows the user to monitor, or to track after the fact, the receipt time and nature of selected classes of messages that are received by the router 21 and the disposition of each such received message. Steps (3), (4), (5), (6) and/or (7) can be performed by a proxy server 70, associated with the router 21 and optionally serving one, two or many augmented routers. The message analytics and archiving are performed separately for each asserted source, each asserted destination D and each network region. FIG. 2 schematically illustrates a system suitable for implementing this first embodiment.

The selected metadata read by the augmented router includes one or more of the following: length by length (measured in bytes or in µsec) of the payload portion of the message; identification of source S1 of the message, whether authenticated or not authenticated; the number, if any, and identifiers of messages previously sent by the asserted source S1 to the asserted destination(s) D1; the number, if any, and identifiers of messages previously sent by the asserted source S1 to the asserted destination(s) D1 within a specified preceding time period (e.g., 90 minutes, 24 hours, 7 days, 30 days); the number, if any, of messages previously sent by one or more of the asserted destination(s) D1 to the asserted source S1 within a specified preceding time period, based upon records assembled and retained by the router or proxy server; and initial characterization of the payload as an access request, an alarm signal, a document, a portion of a static image, a video clip, or "other." This metadata analysis applies to an augmented router in any of the embodiments disclosed here.

Figure 3:
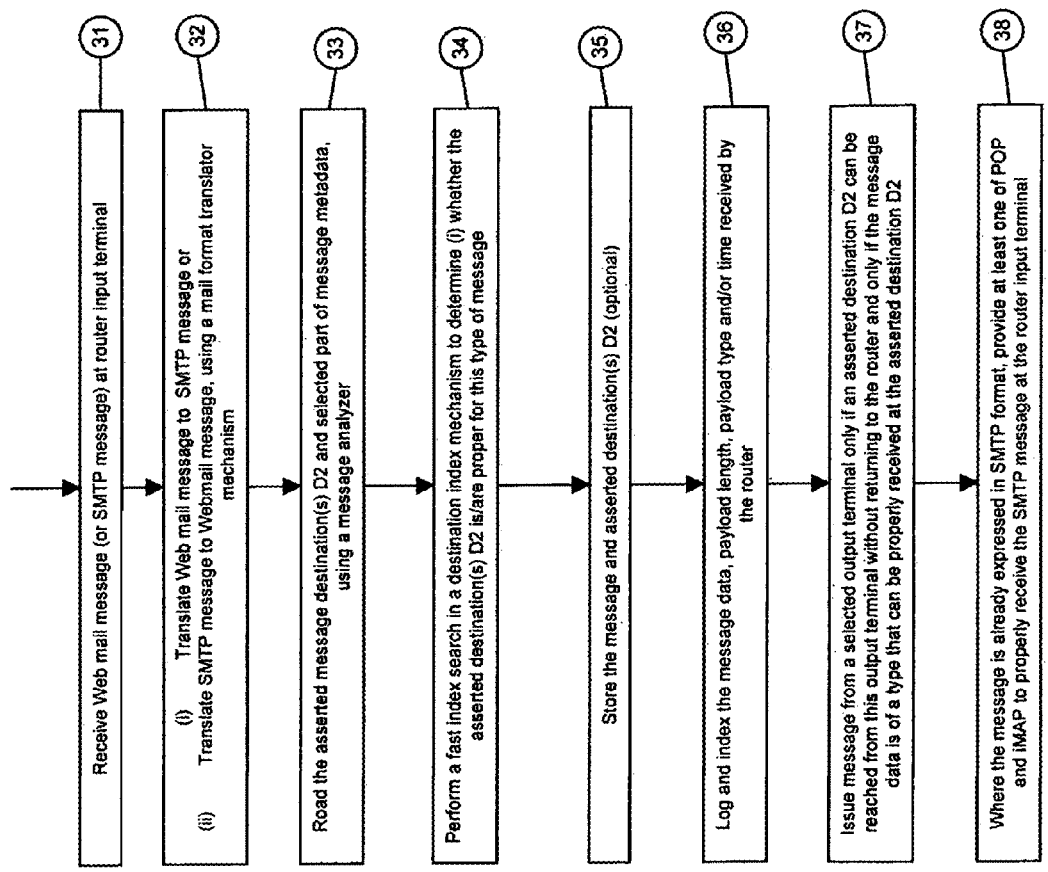
Figure 4:
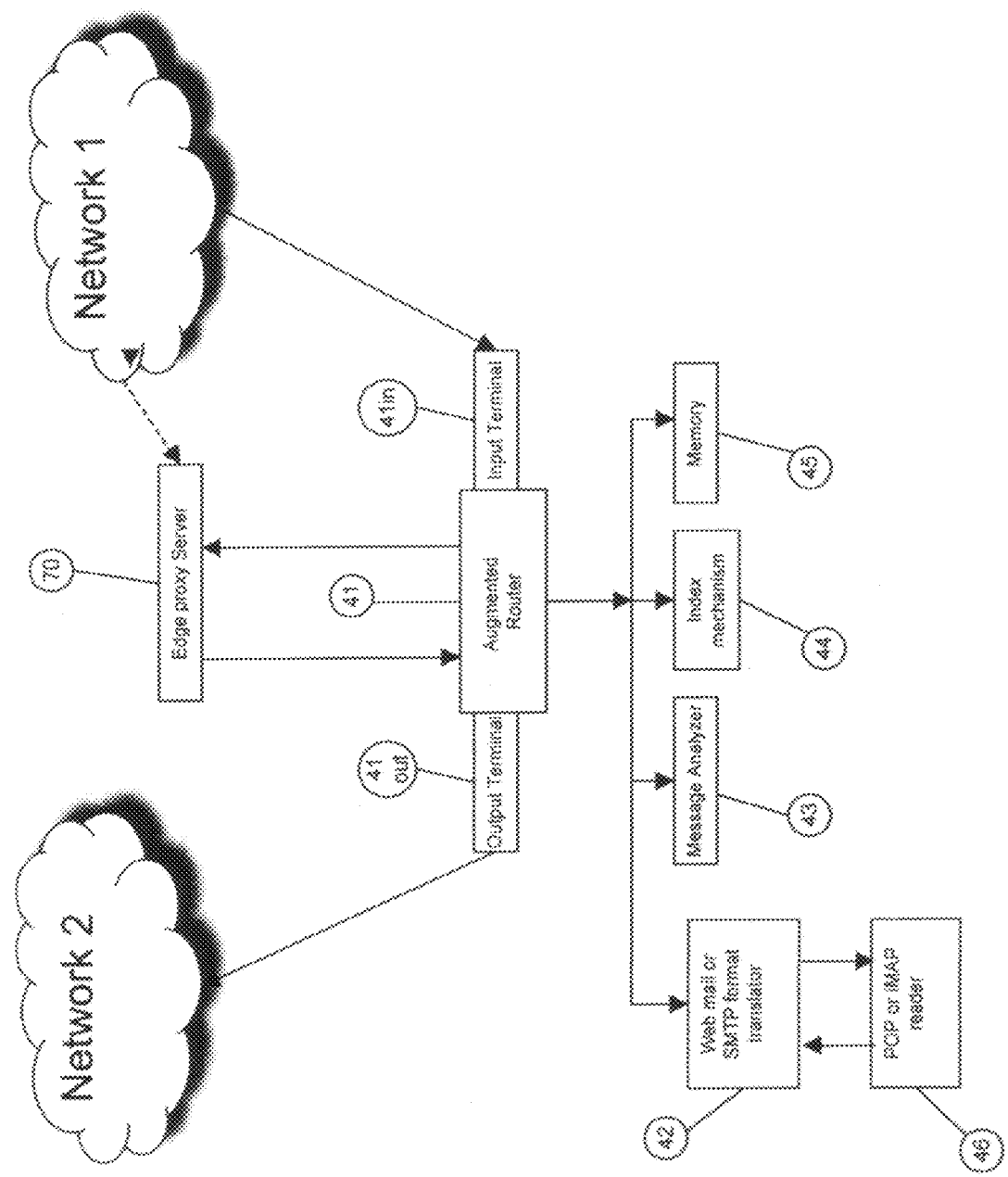

In another embodiment, useful for network signal profiling and illustrated in a flow chart in FIG. 3, an augmented router 41: (1) receives a Web mail message (or SMTP message) at the router input terminal 41 in (step 31); (2) (i) translates a Web Mail message to SMTP for transmission, using a mail format translator mechanism 42 associated with the router 41 or (ii) translates an SMTP message to Web Mail for transmission (step 32); (3) reads the asserted message destination(s) D2 and a selected part of the message metadata, using a message analyzer 43 associated with the router 41 (step 33); (4) performs a fast index search in an associated destination index mechanism 44 to determine (i) whether the asserted destination(s) D2 can be reached from one or more output terminals 41 out of this router and (ii) whether the asserted destination(s) D2 is/are proper for this type of message (step 34); (5) optionally stores the message (header, payload, trailer), asserted source identifier, and asserted destination(s) identifier(s), depending upon data type, in a memory unit 45 associated with the router 41 (step 35); (6) optionally logs and indexes the message data, payload length, data type and/or time received by the router 41 (step 36); and (7) issues the message from a selected output terminal 41 out if an asserted destination D2 can be reached from this output terminal 41 out without returning to this router 41, and only if the message data is of a type that can be properly received at the asserted destination(s) (step 37). Optionally, where the message is already expressed in an STMP format, the router 41 (8) provides at least one of POP and iMAP (e-mail receipt protocols) 46 to properly receive the STMP message at the input terminal 41 in (step 38). Steps (2), (3), (4), (5), (6), (7) and/or (8) can be performed by a proxy server 70 associated with the router 41. FIG. 4 schematically illustrates a system suitable for implementing this embodiment.

Figure 5:
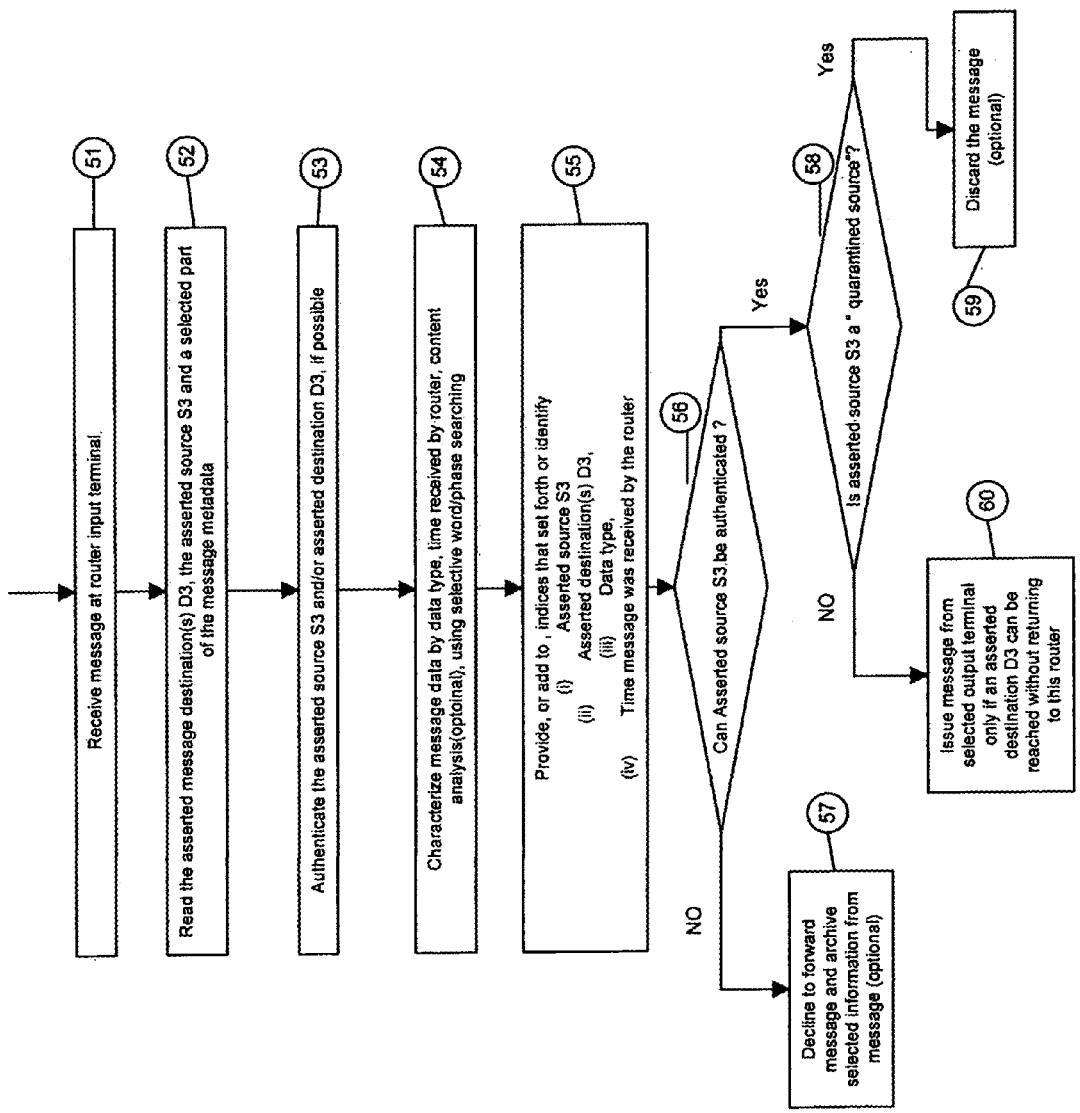
Figure 6:
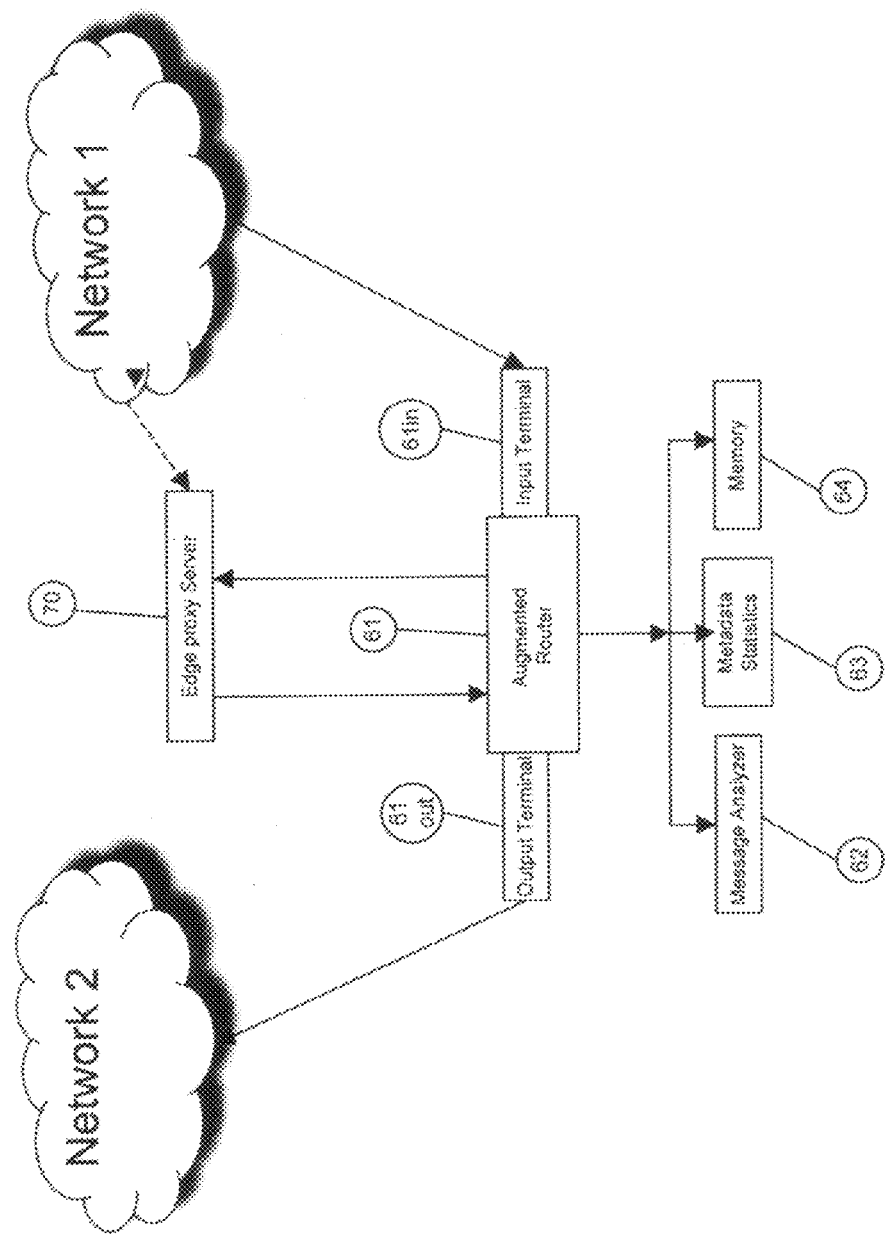

In another embodiment, useful for browser monitoring and illustrated in a flow chart in FIG. 5, an augmented router 61: (1) receives a message at a router input terminal 61 in (step 51); (2) reads an identifier(s) of the asserted message destination(s) D3, an identifier of the asserted source S3, and a selected part of the message metadata (step 52); (3) authenticates the asserted source S3 and/or the asserted destination(s) D3 (step 53); (4) characterizes the message data by type (e.g., access request, document, alarm signal, part of a static image, part of a video presentation, etc.), by time received, by length (measured in bytes or in μsec), and by content (optional), using selective word/phrase searching (step 54); (5) prepares, or adds to, indices that set forth or identify (i) the asserted source S3, (ii) the asserted destination(s) D3, (iii). data type, and/or (iv) time received. by the router 61 (step 55); (6) determines whether the asserted source S3 can be authenticated (step 56); (7) when the answer to the query in step 56 is "no," optionally declines to forward the message and archives selected information from the message (step 57); (8) when the answer to the query in step 56 is "yes," determines if the asserted source S3 is a "quarantined" source (step 58); (9) when the answer to the query in step 58 is "yes," optionally discards the message (step 59); (10) when the answer to the query in step 59 is "no," issues the message from a selected output terminal 61 out if the asserted destination(s) D3 can be reached from this output terminal 61 out without returning to this router 61 (step 60). Steps (2), (3), (4), (5), (6), (7) and (8) can be performed by a proxy server 70 associated with the router 61. FIG. 6 schematically illustrates a system suitable for implementing this embodiment.

Figure 7A:
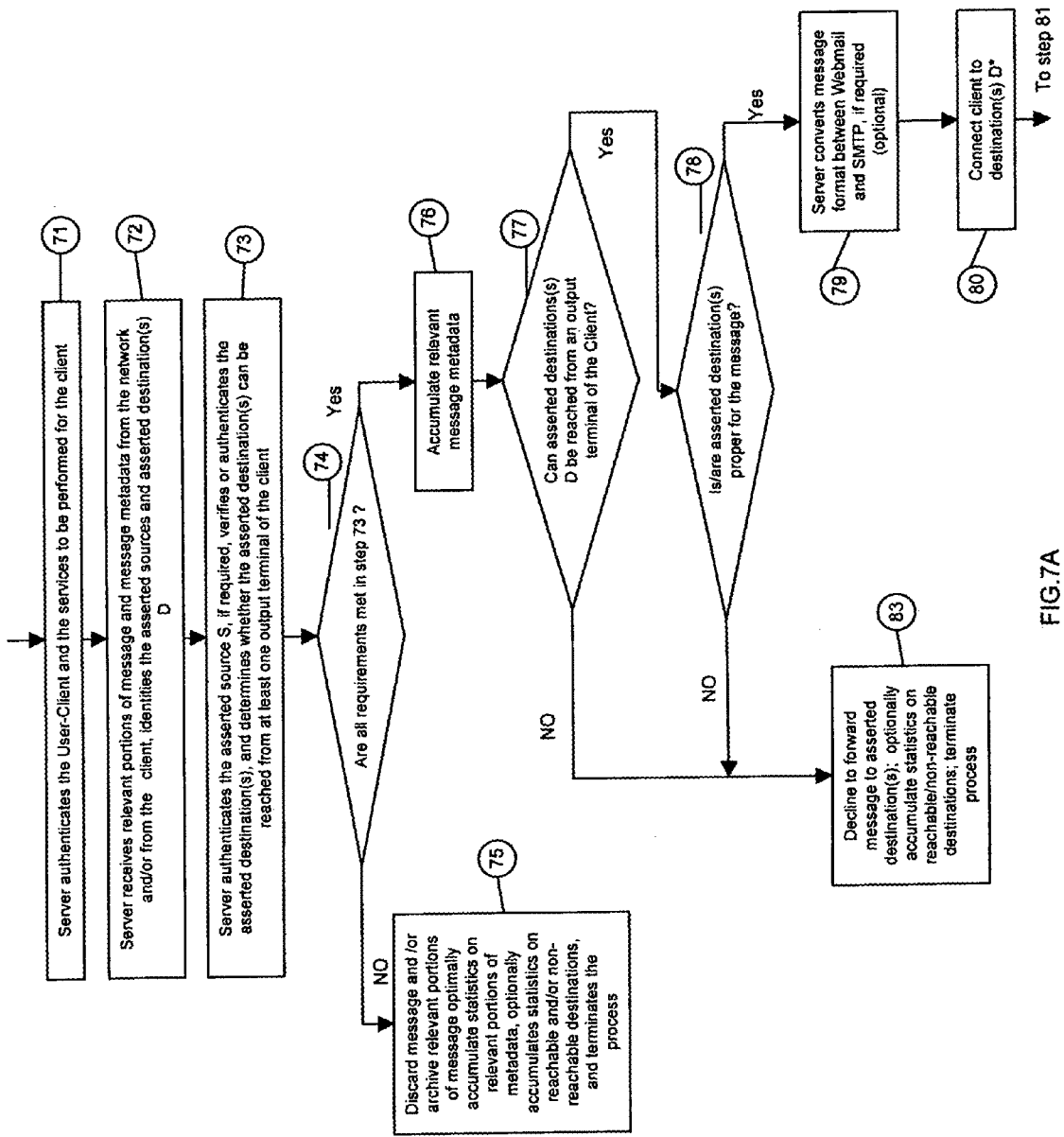
FIG. 7 is a flow chart of actions taken by an Edge Proxy Server that serves the router and helps implement the embodiments
Figure 7B:
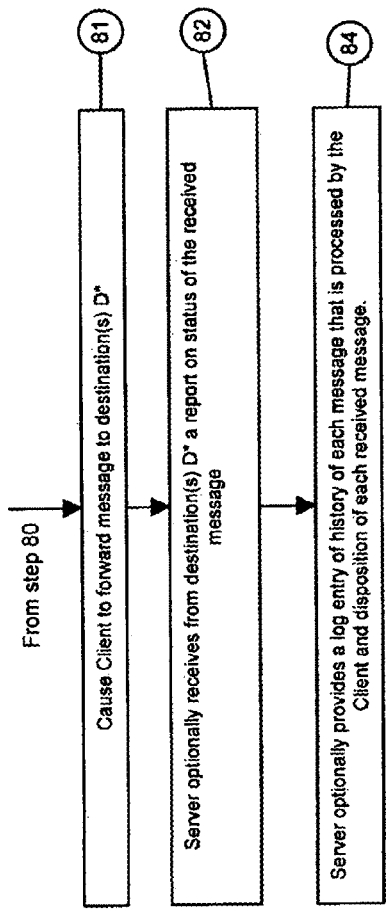

As illustrated in FIG. 7, an Edge Proxy Server 70 supplements or helps implement an augmented router 61 (User-Client) by performing part or all of the following processes or steps. In step 71, the Server 70 authenticates the User-Client (the augmented router 61) and the particular services to be performed for this Client. In step 72, the Server 70 receives the relevant portions of the message (directly from the network, or from the Client) and identifies the asserted source S and asserted destination(s) D for the message from header metadata. In step 73, the Server 70 authenticates the asserted source (if required), verifies or authenticates the asserted destination(s), and determines whether the asserted destination(s) can be reached from at least one of the output terminals 61 out of the Client. If one or more of the queries in step 73 is not confirmed, in step 74, the Server 70 discards the message and/or archives relevant portions of the message metadata, optionally accumulates statistics 63 on reachable and/or non-reachable destinations, and terminates this process, in step 75.

If the answer to the query in step 73 is "yes," (message is not discarded or archived), the Server accumulates relevant metadata associated with the message, from the header, payload and/or trailer, in step 76. In step 77, the Server determines if the asserted destination(s) D can be reached from an output terminal of the Client without passing again through the Client.

If the answer to the query in step 77 is "yes," the Server determines if the asserted destination(s) D is/are proper for the message, from the data type and/or from the message metadata, in step 78. If the answer to the query in step 78 is "yes," the Server optionally converts the message format between Web mail and SMTP, if required, in step 79, and connects the Client to the asserted destination(s) D, or to the next router in a path leading to the asserted destination(s) D (referred to collectively as "destination D*"), in step 80. In step 81, the Server causes the message to be forwarded to destination(s) D*. In step 82, the Server optionally receives from destination D* a report on status of the received message.

If the answer to the query in step 77 is "no," or if the answer to the query in step 78 is "no," the Server declines to forward the message from the Client, optionally accumulates statistics on reachable and/or non-reachable destinations, and terminates this process, in step 83.

In step 84, the Server optionally provides a log entry of history of each message that is processed by the Client, and the disposition of each received message (forward, discard, archive, etc.).

The statistics accumulated by the router and/or by the proxy server, from the metadata, from messages that are forwarded, and from messages that the router declines to forward, can be used as a database for key word or phrase searching, for metadata attribute searching, and for monitoring performance of the router.

I claim:

1. A computer-aided method for augmenting a network router, the method comprising:
  (1) receiving a message from a message communication network at an input terminal of a router, the router having at least one router output terminal, where the message has an asserted message source identifier ("AMSI") and has at least one asserted message destination identifier ("AMDI");
  (2) reading the AMSI, the at least one AMDI, and at least one metadata component associated with the received message;
  (3) characterizing, by a proxy server associated with the router, the message by data type, by time the message is received at the router, by content of the message using selective word/phrase searching, by the AMSI, and by the at least one AMDI, where the data type of the message includes at least one of access request, alarm signal, portion or all of a document included, portion or all of a static image included, and portion or all of a video segment included, wherein the proxy server is configured to receive at least a portion of the message from the router, and wherein the proxy server is configured to be in communication with and to serve the router and at least one other router via a network;
  (4) performing, by the proxy server, an index search, in a database associated with the router, to determine (i) whether at least one asserted message destination identified by the at least one AMDI can be reached from the at least one output terminal of the router without passing through the router again and (ii) whether the at least one asserted message destination is acceptable for the data type of the message received by the router based on the asserted message source identified by the AMSI and the message characterization;
(5) when the two queries, (i) and (ii), in step (4) are answered "yes" and "yes," transmitting the received message from the at least one router output terminal and accumulating statistics on the received message, if the at least one asserted message destination can be reached from the at least one router output terminal, without passing through the router again; and
(6) when at least one of the two queries, (i) and (ii), in step (4) is answered "no," declining to transmit or forward the received message, and accumulating statistics on the received messages.

2. The method of claim 1, further comprising logging and indexing at least one of said at least one metadata component, said AMSI, said at least one AMDI, said time said message was received at said router, and disposition of said message by said router.

3. A computer-aided method for augmenting a network router, the method comprising:
(1) receiving a message from a message communication network at an input terminal of a router, the router having at least one router output terminal, where the received message has an asserted message source identifier ("AMSI"), and has at least one asserted message destination identifier ("AMDI");
(2) determining a format in which the message is expressed;
(3a) when the message is expressed in Web mail format and another format is required, translating the message format to Simple Mail Transport Protocol (SMTP) format;
(3b) when the message is expressed in SMTP format and another format is required, translating the message format to Web mail format;
(4) reading the AMSI, the at least one AMDI, and at least one metadata component associated with the received message;
(5) characterizing, by a proxy server associated with the router, the message by data type, by time received at the router, by content of the message using selective word/phrase searching, by the AMSI, and by the at least one AMDI, where the message data type includes at least one of access request, alarm signal, portion or all of a document included, portion or all of a static image included, and portion or all of a video segment included, wherein the proxy server is configured to receive at least a portion of the message from the router, and wherein the proxy server is configured to be in communication with and to serve the router and at least one other router via a network;
(6) determining, by the proxy server, whether at least one asserted message destination identified by the at least one AMDI can be reached from at least one output terminal of the router without passing through the router again;
(7) determining, by the proxy server, whether the at least one asserted message destination is acceptable for the data type of message received based on the asserted message source identified by the AMSI and the message characterization;
(8) when the two queries in steps (6) and (7) are answered "yes" and "yes," transmitting the received message at the at least one output terminal and accumulating statistics on the received message; and
(9) when at least one of the two queries in steps (6) and (7) is answered "no," declining to transmit or forward the received message, and accumulating statistics on the received message.

4. The method of claim 3, further comprising:
logging and indexing at least one of said at least one message metadata component, said AMSI, said at least one AMDI, said time said message was received at said router, and disposition of said message by said router.

5. A computer-aided method for augmenting a network router, the method comprising:
(1) receiving a message from a message communication network at an input terminal of a router, the router having at least one router output terminal, where the message has an asserted message source identifier ("AMSI") and has at least one asserted message destination identifier ("AMDI");
(2) reading the AMSI, the at least one AMDI, and of at least one metadata component associated with the received message;
(3) characterizing, by a proxy server associated with the router, the message by data type, by time received at the router, by content of the message using selective word/phrase searching, by the AMSI, and by the at least one AMDI, where the data type of the message includes at least one of access request, alarm signal, portion or all of a document included, portion or all of a static image included, and portion or all of a video segment included, wherein the proxy server is configured to receive at least a portion of the message from the router, and wherein the proxy server is configured to be in communication with and to serve the router and at least one other router via a network;
(4) determining, by the proxy server, whether at least one asserted message destination identified by the at least one AMDI can be reached from at least one output terminal of the router without passing through the router again;
(5) determining, by the proxy server, whether the at least one asserted message destination is acceptable for the data type of message received based on the asserted message source identified by the AMSI and the message characterization;
(6) providing, or adding to, indices that set forth or identify at least one of (i) an asserted message source, an asserted message destination, (iii) a data type, (iv) a time the message was received by the router and (v) a length of payload of the received message;
(7) when the asserted message source cannot be authenticated, declining to forward or transmit the received message and archiving selected information from at least one of (a) the message and (b) the at least one metadata component, and accumulating statistics on the received message;
(8) when the asserted message source can be authenticated, determining if the asserted message source is a quarantined source;
(9) when the asserted message source is determined to be a quarantined source, discarding the message and accumulating statistics on the received message; and
(10) when the asserted source is determined not to be a quarantined source, transmitting the message from the at least one output terminal of the router if the asserted message destination can be reached from the at least one router output terminal, and accumulating statistics on the received message.

6. The method of claim 5, further comprising logging and indexing said at least one metadata component, said AMSI, said at least one AMDI, said time said message was received at said router, and disposition of said message by said router.

* * * * *